United States Patent
Craig et al.

(10) Patent No.: US 10,444,012 B2
(45) Date of Patent: Oct. 15, 2019

(54) SUPPORT STRUCTURE DETECTION

(71) Applicant: ATOMIC ENERGY OF CANADA LIMITED, Chalk River (CA)

(72) Inventors: Stuart Thomas Craig, Deep River (CA); Kenneth Robert Chaplin, Toronto (CA)

( * ) Notice: Subject to any disclaimer, the term of this patent is extended or adjusted under 35 U.S.C. 154(b) by 1209 days.

(21) Appl. No.: 14/553,200

(22) Filed: Nov. 25, 2014

(65) Prior Publication Data
US 2015/0106055 A1  Apr. 16, 2015

Related U.S. Application Data

(63) Continuation of application No. PCT/CA2012/050207, filed on Mar. 30, 2012.

(51) Int. Cl.
| G01B 21/14 | (2006.01) |
| G21C 17/00 | (2006.01) |
| G21C 17/06 | (2006.01) |
| G21D 3/00 | (2006.01) |
| G21C 1/20 | (2006.01) |

(52) U.S. Cl.
CPC ............. *G01B 21/14* (2013.01); *G21C 17/00* (2013.01); *G21C 17/06* (2013.01); *G21D 3/001* (2013.01); *G21C 1/20* (2013.01); *Y02E 30/40* (2013.01)

(58) Field of Classification Search
CPC ........ G01B 21/14; G21C 17/00; G21C 17/06; G21C 1/20; G21D 3/001; Y02E 30/40
USPC ........................................................ 702/157
See application file for complete search history.

(56) References Cited

U.S. PATENT DOCUMENTS

| 5,816,626 A * | 10/1998 | Anderson ............... F16L 37/22 |
| | | 285/231 |
| 5,974,862 A * | 11/1999 | Lander .................. G01M 3/243 |
| | | 702/51 |
| 2005/0267703 A1 | 12/2005 | Bondurant et al. |
| 2010/0053191 A1 | 3/2010 | Chang et al. |

FOREIGN PATENT DOCUMENTS

CA    2698252    3/2009

OTHER PUBLICATIONS

Kao, Design of Low Noise Amplifier in Common Gate Configuration for Ultra-Wideband Applications, 2007.*
Vazquez, A new Method for Design of IIR Filters with Flat Magnitude Response. Aug. 2006.*
Kurshan, Design of Finite Impulse Response Digital Filters with Nonlinear Phase Response, Oct. 1981.*
International Preliminary Report on Patentability, dated Oct. 1, 2014, 5 pages.
Written Opinion of the International Searching Authority, dated Jan. 3, 2013.
The Extended European Search Report dated Dec. 15, 2015, 6 pages.

* cited by examiner

*Primary Examiner* — John E Breene
*Assistant Examiner* — Dacthang P Ngo
(74) *Attorney, Agent, or Firm* — Anderson Gorecki LLP

(57) ABSTRACT

While typically-collected diameter data contains information for detecting some garter springs, many garter springs may not be detected without processing the diameter data. Responsively, a method for processing the diameter data to detect the garter springs has been developed. In particular, the processing involves fitting of the diameter data to a shape, determining residual errors and using the residual errors to locate garter springs.

9 Claims, 6 Drawing Sheets

SUPPORT STRUCTURE DETECTION

FIELD

The present application relates generally to analysis and maintenance of tubes and, more specifically, to detection of a support structure external to a tube.

BACKGROUND

It is conventional in some nuclear reactors for bundles of fuel to pass through the reactor within horizontal pressure tubes. Each pressure tube is surrounded by a calandria tube. Garter springs provide a support structure for a pressure tube within a calandria tube and act to prevent contact between pressure tube and calandria tube. In an attempt to detect garter springs, it is known to place a measurement device into the pressure tube to record data related to the diameter of the pressure tube at each of a plurality of angular offsets as a function of distance along the pressure tube.

BRIEF DESCRIPTION OF THE DRAWINGS

Reference will now be made, by way of example, to the accompanying drawings which show example implementations; and in which.

DETAILED DESCRIPTION

While typically-collected diameter data contains information for detecting some garter springs, many garter springs may not be detected without processing the diameter data. Responsively, a method for processing the diameter data to detect the garter springs has been developed. In particular, the processing involves fitting of the diameter data to a shape, determining residual errors and using the residual errors to locate garter springs.

According to an aspect of the present disclosure, there is provided a method of locating a support structure external to a tube. The method including receiving a plurality of data points, where said receiving includes receiving a data point representative of a diameter of said tube at each of a plurality of angular offsets for a first range of axial positions in said tube, fitting a shape to said plurality of data points, determining an integrated residual error between said data points and said shape and associating said integrated residual error with said first range of axial positions. The method further comprises repeating said receiving, fitting, determining and associating for a further plurality of axial positions, thereby producing a plurality of integrated residual errors and indicating, as a location of said support structure, an axial position associated with a local maximum integrated residual error among said plurality of integrated residual errors. In other aspects of the present application, a processor is provided for carrying out this method and a computer readable medium is provided for adapting a processor in a general purpose computer to carry out this method.

Other aspects and features of the present disclosure will become apparent to those of ordinary skill in the art upon review of the following description of specific implementations of the disclosure in conjunction with the accompanying figures.

Within a reactor, the weight of fuel, coolant and pressure tube is supported by four garter springs. It can be illustrated that each garter spring distorts the shape of the pressure tube. It can also be illustrated that the cross-sections of a pressure tube at a garter spring are more elliptical than the cross-sections of the same pressure tube away from the garter spring. Put another way, for multiple cross-sections of a pressure tube, the ratio of a horizontal dimension to a vertical dimension is greater for the cross-sections positioned at or near the garter spring.

Figure 1:
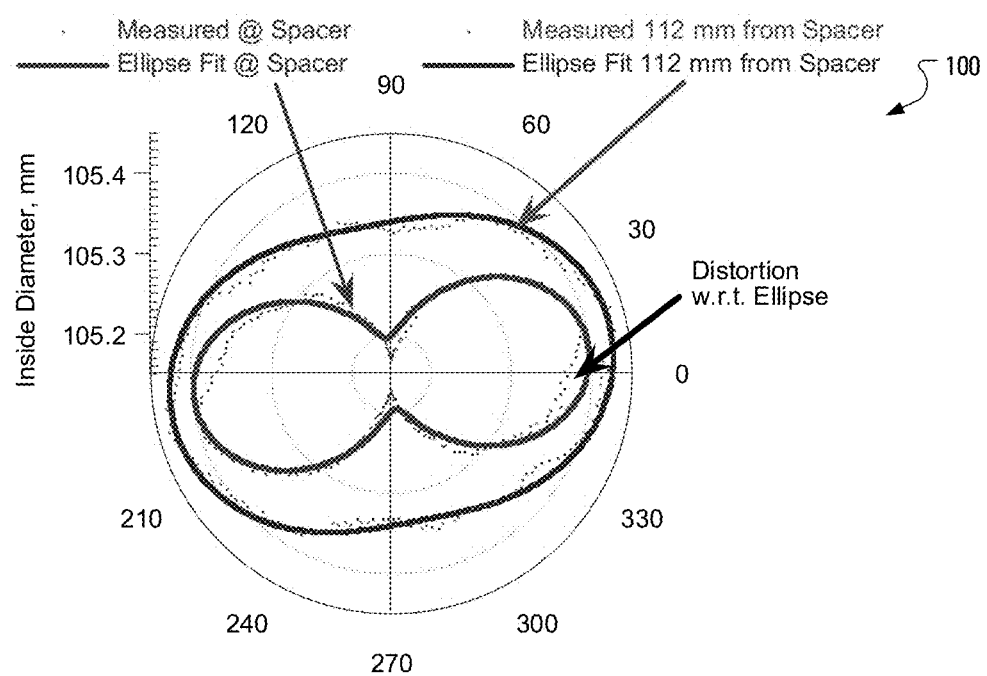
FIG. 1 illustrates two cross-sections of a pressure tube.

FIG. 1 illustrates two cross-sections of a pressure tube. One of the cross-sections is located at a garter spring (also called a "spacer") and the other of the cross-sections is located at a position 112 mm away from a garter spring.

As can be seen in FIG. 1, the major axes of the cross-sections are approximately horizontal. Examination of numerous pressure tubes has found that the angle of the major axis tends to the horizontal; however, variations up to 30° from horizontal have been noted. It has further been found that elliptical curve fits are relatively insensitive to rapid changes in diameter that contribute to noise to the signal analysis. It has also been found that differences between measured diameters and the fitted ellipse are greater at garter springs than away from garter springs and that differences in cross-section occur in axially short distances In operation, a plurality of data points may be collected over a length of a pressure tube. The data points may, for example, be representative of a diameter of a pressure tube. Each of the data points may be associated with an angular offset and an axial position in the pressure tube. The collection of the data points may, for example, employ a 1 mm pitch spiral-scan with 180 points per revolution, with the points in each revolution equally spaced around the circumference of the pressure tube.

Notably, when diameter data points are collected at a rate of 180 points per revolution, it may be considered that data has been collected for every degree for 360°; however, the diameter is the same for angles that are 180° apart. In particular, the diameter at 180° is the same as the diameter 0°.

Various analyses of pressure tube diameter have been considered for garter spring detection. Based on the above observations, the two primary diameter analyses are:
 the horizontal-vertical diameter difference, and
 the residual of fitting the measured diameter to a shape, i.e., the integrated difference between the points and the shapes in FIG. 1.

Both diameter analyses may employ filtering to suppress noise and extract a garter spring signature.

Figure 2:
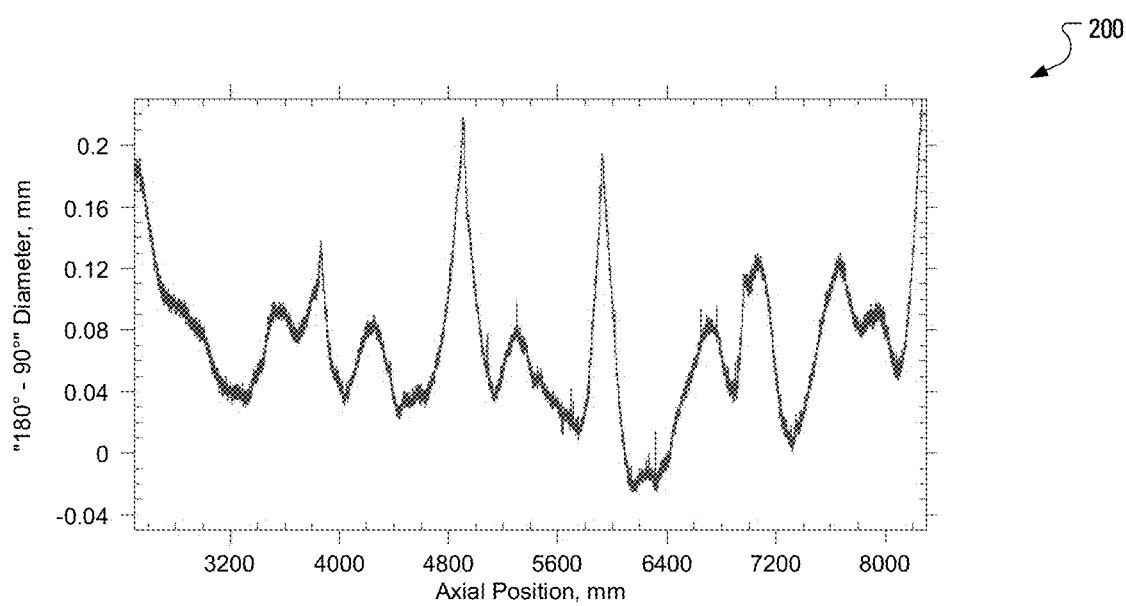
FIG. 2 illustrates an example plot of horizontal diameter minus vertical diameter.
Figure 3:
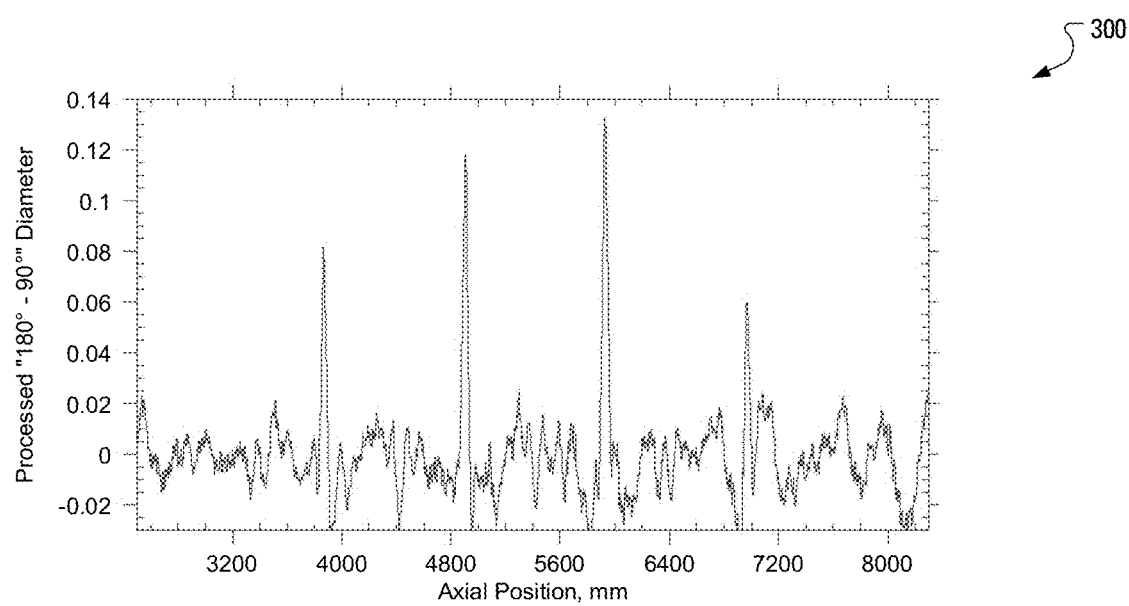
FIG. 3 illustrates an example plot of a filtered version of the horizontal diameter minus vertical diameter plot of FIG. 2.

An example plot 200 of horizontal diameter minus vertical diameter is illustrated in FIG. 2. Two inboard garter springs are clearly indicated by peaks near axial positions 4900 mm and 5900 mm. A lower amplitude indication is visible near 3900 mm; however, the presence of a garter spring near 7000 mm is largely obscured and there are six or more other peaks. An example plot 300 of a filtered version of the horizontal diameter minus vertical diameter plot 200 of FIG. 2 is illustrated in FIG. 3. It may be considered that the locations of all four garter springs are more clearly defined in the filtered horizontal diameter minus vertical diameter plot of FIG. 3 that in the horizontal diameter minus vertical diameter plot 200 of FIG. 2.

Figure 4:
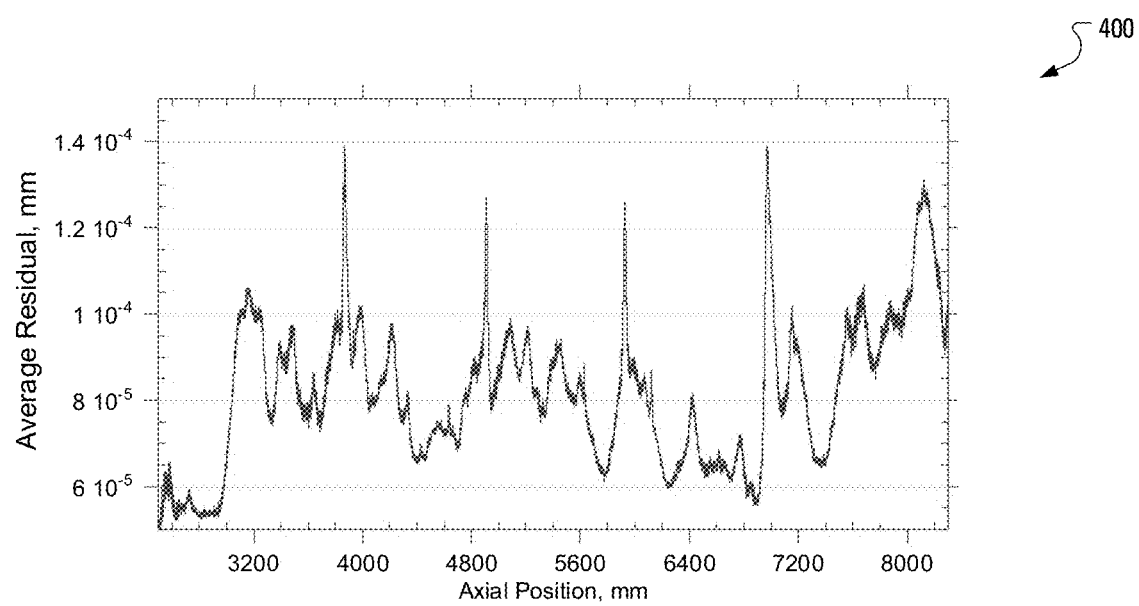
FIG. 4 illustrates a plot of differences between data points and ellipse that has been fit to the data points.
Figure 5:
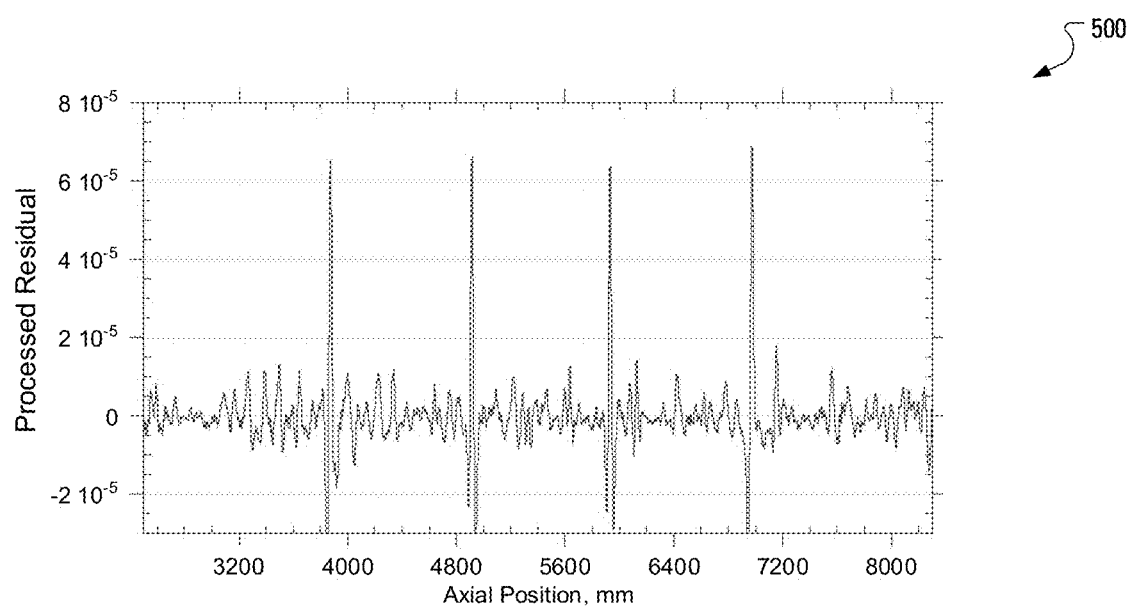
FIG. 5 illustrates a plot of a filtered version of the differences between the data points and ellipse that has been fit to the data points of FIG. 4.

A shape-fitting analysis can produce a similar results to a horizontal-vertical diameter difference analysis. FIG. 4 illustrates a plot 400 of differences between the data points and ellipse that has been fit to the data points. FIG. 5 illustrates a plot 500 of filtered differences between the data points and ellipse that has been fit to the data points. In both the plot 400 of raw differences between data and ellipse and the plot 500 of filtered differences between data and ellipse, garter spring locations are clearly discernible.

Figure 6:
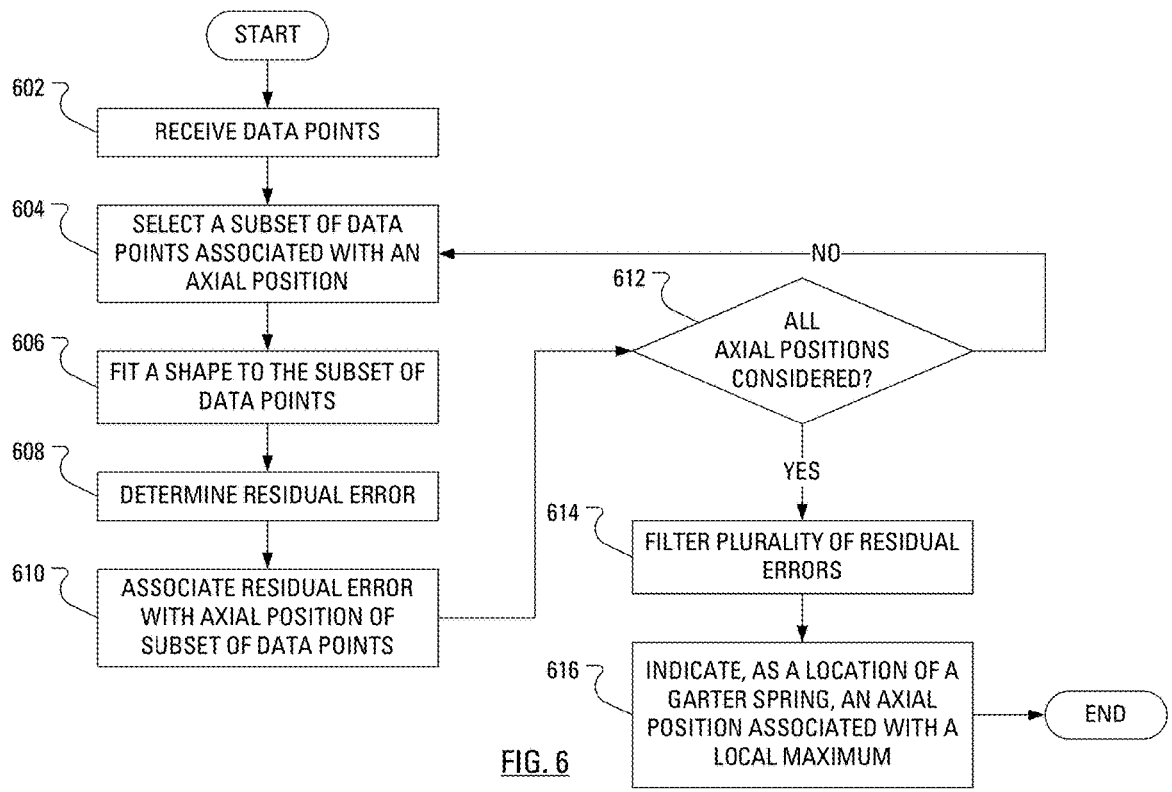
FIG. 6 illustrates example steps in a method of locating a support structure according to an embodiment of the present application.

Example steps of a method of locating garter springs are illustrated in FIG. 6. The method may, for example, be carried out on a general purpose computer equipped with typical input and output interfaces and a processor.

In the initial step, the processor receives (step 602) the plurality of data points collected in the scan. As discussed hereinbefore, the data points are representative of a diameter of the pressure tube at each of a plurality of angular offsets. The device collecting the data may, in one instance, be stationary at a single axial position while obtaining diameter data for each of the plurality of angular offsets. However, the device collecting the data may, in another instance, be in motion such that the axial position associated with diameter data for one of the plurality of angular offsets is offset from the axial position associated with diameter data for the subsequent one of the plurality of angular offsets. A spiral scan has been discussed hereinbefore, with a pitch of 1 mm, meaning that diameter data for 360° of angular offsets is obtained for every 1 mm that the device collecting the data advances through the pressure tube.

To process the data points, the processor fits (step 606) a shape to the data points.

It should be clear that a single shape is not fit to the entire set of data points. Instead, the processor may fit a shape to a subset of the data points. The definition of the subset of data points can depend on the manner in which the data points have been obtained. If the device collecting the data was stationary at a single axial position while obtaining diameter data for each of the plurality of angular offsets, the subset of data points may be defined by association with the single axial position. In the event that a spiral scan has been employed, the subset of data points may be defined as diameter data for each of the plurality of angular offsets in a full 360° revolution. The subset of data points thus defined my, for example, be associated with the axial position associated with the 0° data point, i.e., the first data point in the subset. Accordingly, generally, the processor selects (step 604) a subset of the data points associated with an axial position.

The processor then fits (step 606) a shape to the subset of data points.

In one embodiment of the present application, the particular shape to which the data points in the subset may be fit in step 604 is an ellipse. In another embodiment of the present application, the particular shape to which the data points in the subset may be fit in step 604 is a circle.

Once the processor has fit (step 606) the subset of data to a shape, the processor may then determine (step 608) an integrated residual error between the data points in the subset and the shape. Upon determining (step 608) the integrated residual error for the axial position associated with the subset of data points, the processor may associate (step 610) the integrated residual error with the axial position associated with the subset of data points.

The processor may then determine (step 612) whether subsets of data points for all axial positions have been considered. If subsets of data points remain to be considered, the processor returns to select (step 604) a further subset of data points to process.

If no more subsets of data points remain to be considered, a plurality of integrated residual errors may exist for a corresponding plurality of axial positions. Optionally, the processor may subject (step 614) the plurality of integrated residual errors to a digital filter.

While many digital filters may be suitable, a three-stage digital filter has been used with some success. The first stage of the three-stage digital filter may be formed as a 6th order infinite impulse response Butterworth low pass filter, with a 3 dB cut off at 18 mm. The second stage of the three-stage digital filter may be formed as a 4th order finite impulse response derivative filter. The third stage of the three-stage digital filter may be formed as an order 40 finite impulse response step change cross correlation filter.

Without regard to whether filtering has been performed on the integrated residual errors, the processor may then indicate (step 616), as a location of a garter spring, an axial position associated with a local maximum integrated residual error among the plurality of integrated residual errors.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of locating a garter spring external to a pressure tube, said method comprising:
   receiving, from a measurement device in said pressure tube, a plurality of data points, where said receiving includes receiving a data point representative of a diameter of said pressure tube at each of a plurality of angular offsets for a first range of axial positions in said pressure tube;
   fitting a shape to said plurality of data points;
   determining an integrated residual error between said data points and said shape;
   associating said integrated residual error with said first range of axial positions;
   repeating said receiving, fitting, determining and associating for a further plurality of axial positions, thereby producing a plurality of integrated residual errors;
   applying a digital filter to said plurality of integrated residual errors, thereby producing a plurality of filtered integrated residual errors; and
   indicating, as a location of said garter spring, an axial position associated with a local maximum filtered integrated residual error among said plurality of filtered integrated residual errors.

2. The method of claim 1 wherein said digital filter comprises a three-stage digital filter.

3. The method of claim 2 wherein a first stage of said three-stage digital filter comprises a 6th order infinite impulse response Butterworth low pass filter, with a 3 dB cut off at 18 mm.

4. The method of claim 2 wherein a second stage of said three-stage digital filter comprises a 4th order finite impulse response derivative filter.

5. The method of claim 2 wherein a third stage of said three-stage digital filter comprises an order 40 finite impulse response step change cross correlation filter.

6. The method of claim 1 wherein said shape is a circle.
7. The method of claim 1 wherein said shape is an ellipse.
8. A device comprising:
a processor adapted to:
- receive, from a measurement device in said pressure tube, a plurality of data points, where said processor is adapted to receive a data point representative of a diameter of a pressure tube at each of a plurality of angular offsets for a first range of axial positions in said pressure tube;
- fit a shape to said plurality of data points;
- determine an integrated residual error between said data points and said shape;
- associate said integrated residual error with said first range of axial positions;
- repeat said receiving, fitting, determining and associating for a further plurality of axial positions, thereby producing a plurality of integrated residual errors;
- digitally filter said plurality of integrated residual errors to, thereby, produce a plurality of filtered integrated residual errors; and
- indicate, as a location of a garter spring, an axial position associated with a local maximum filtered integrated residual error among said plurality of filtered integrated residual errors.

9. A computer readable medium containing computer-executable instructions that, when performed by a processor, cause said processor to:
- receive a plurality of data points, where said instructions cause said processor to receive a data point representative of a diameter of said pressure tube at each of a plurality of angular offsets for a first range of axial positions in said pressure tube;
- fit a shape to said plurality of data points;
- determine an integrated residual error between said data points and said shape;
- associate said integrated residual error with said first range of axial positions;
- repeat said receiving, fitting, determining and associating for a further plurality of axial positions, thereby producing a plurality of integrated residual errors;
- digitally filter said plurality of integrated residual errors to, thereby, produce a plurality of filtered integrated residual errors; and
- indicate, as a location of a garter spring, an axial position associated with a local maximum filtered integrated residual error among said plurality of filtered integrated residual errors.

* * * * *